(12) United States Patent
Chen et al.

(10) Patent No.: US 12,166,367 B2
(45) Date of Patent: Dec. 10, 2024

(54) METHOD FOR CONTROLLING CHARGING BETWEEN ELECTRONIC DEVICES AND ELECTRONIC DEVICE

(71) Applicant: BEIJING XIAOMI MOBILE SOFTWARE CO., LTD., Beijing (CN)

(72) Inventors: Yichun Chen, Beijing (CN); Yongjian Deng, Beijing (CN); Feng Qiu, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 727 days.

(21) Appl. No.: 17/330,299

(22) Filed: May 25, 2021

(65) Prior Publication Data
US 2022/0131395 A1 Apr. 28, 2022

(30) Foreign Application Priority Data
Oct. 26, 2020 (CN) .......................... 202011158974.4

(51) Int. Cl.
*H02J 7/00* (2006.01)
(52) U.S. Cl.
CPC ...... *H02J 7/00045* (2020.01); *H02J 7/00034* (2020.01); *H02J 7/0071* (2020.01); *H02J 2310/22* (2020.01)
(58) Field of Classification Search
CPC .................................................. H02J 7/00045
USPC ........................................................ 320/137
See application file for complete search history.

(56) References Cited

U.S. PATENT DOCUMENTS

| 10,663,529 | B1 * | 5/2020 | Bolotski ............ G01R 31/3648 |
| 2007/0236975 | A1 | 10/2007 | Lippojoki et al. |
| 2015/0280478 | A1 * | 10/2015 | Nonogaki ............... H02J 7/342 320/103 |
| 2015/0340898 | A1 | 11/2015 | Schwartz et al. |

(Continued)

FOREIGN PATENT DOCUMENTS

| CA | 2851983 | * | 8/2014 |
| CN | 103249174 A | | 8/2013 |

(Continued)

OTHER PUBLICATIONS

European Patent Application No. 21178580.3 extended Search and Opinion dated Nov. 26, 2021, 9 pages.

(Continued)

*Primary Examiner* — Yalkew Fantu
(74) *Attorney, Agent, or Firm* — Cozen O'Connor

(57) ABSTRACT

A charging control method and an electronic device implementing a charging control method includes: sending a first data packet, in which, the first data packet includes to-be-charged identification information and first characteristic information of the first electronic device; receiving a second data packet corresponding to the first data packet sent by the second electronic device, in which, the second data packet includes power supply identification information and charging strategy information; determining and performing a charging strategy according to the second data packet, in which, the charging strategy includes at least one of: the first electronic device receiving power supply from the second electronic device, and the first electronic device supplying power to the second electronic device.

18 Claims, 8 Drawing Sheets sending a first data packet — S110 receiving a second data packet corresponding to the first data packet sent by the second electronic device — S120 determining and performing a charging strategy according to the second data packet — S130

(56) References Cited

U.S. PATENT DOCUMENTS

| | | | | |
|---|---|---|---|---|
| 2016/0047861 A1* | 2/2016 | Chen | ............... | H02J 7/0047 |
| | | | | 324/426 |
| 2018/0026457 A1* | 1/2018 | Delevski | ............ | H02J 7/0024 |
| | | | | 320/106 |
| 2018/0062409 A1* | 3/2018 | Jung | ............... | H02J 7/0071 |

FOREIGN PATENT DOCUMENTS

| | | | | |
|---|---|---|---|---|
| CN | 104466286 A | | 3/2015 | |
| CN | 106299515 A | | 1/2017 | |
| CN | 111817382 | * | 7/2020 | |
| CN | 111817383 | * | 7/2020 | |
| WO | WO-2018038423 A1 | * | 3/2018 | ............ H02J 50/12 |

OTHER PUBLICATIONS

Chinese Patent Application No. 202011158974.4, Office Action dated Jun. 4, 2024, 12 pages.
Chinese Patent Application No. 202011158974.4, English translation of Office Action dated Jun. 4, 2024, 14 pages.

\* cited by examiner

| sink_VDM | Package11 | bit0 | is 0, indicating sink-VDM |
| --- | --- | --- | --- |
| | | bit1-bit15 | reserved |
| | | bit16-bit31 | SVID |
| | Package12 | bit0-bit7 | percentage of electricity quantity |
| | | bit8-bit15 | temperature of the whole machine, bit15 represents positive or negative |
| | | bit16-bit31 | reserved |

| source_VDM | Package21 | bit0 | is 1, indicating source-VDM |
| | | bit1-bit15 | reserved |
| | | bit16-bit31 | SVID |
| | Package22 | bit0-bit1 | charging strategy; 00: Go on, 01: Switch power role, 10: Stop charge |
| | | bit2-bit3 | time interval 00:0.5min, 01:1min, 11:2min |
| | | bit4-bit31 | reserved |

FIG. 9

| temperature intervals (°C) | time intervals (min) |
| --- | --- |
| [-10°C, -5°C) | 0.5 |
| [-5°C, 5°C) | 1 |
| [5°C, 30°C] | 2 |
| (30°C, 40°C] | 1 |
| (40°C, 45°C] | 0.5 |

FIG. 10

| difference intervals in quantity of electricity (%) | time intervals (min) |
| --- | --- |
| [0, 10) | 0.5 |
| [10, 30) | 1 |
| [30, 100) | 2 |

FIG. 11

METHOD FOR CONTROLLING CHARGING BETWEEN ELECTRONIC DEVICES AND ELECTRONIC DEVICE

CROSS REFERENCE TO RELATED APPLICATION

This Application claims the benefit of priority to Chinese Application No. 202011158974.4, filed on Oct. 26, 2020, the contents of which are incorporated herein by reference in their entirety.

TECHNICAL FIELD

The present disclosure relates to a field of terminal technologies, and in particular to, a charging control method and an electronic device.

BACKGROUND

With development of technologies, mobile phones and other electronic devices have additional functions and increasing hardware power consumption, causing the mobile phones and other electronic devices to consume power more rapidly. In related scenarios, such as when a user is outdoors or on a journey, an environment where the user is located is not convenient for charging the mobile phones or other electronic devices with a charger. Therefore, there is a charging method for two mobile phones to charge each other in related arts.

SUMMARY

The present disclosure provides a charging control method and an electronic device.

In a first aspect, embodiments of the disclosure provide a charging control method, applicable for a first electronic device connected with a second electronic device through a preset charging cable. The method includes:
  sending a first data packet, in which, the first data packet includes to-be-charged identification information and first characteristic information of the first electronic device;
  receiving a second data packet corresponding to the first data packet sent by the second electronic device, in which the second data packet includes power supply identification information and charging strategy information;
  determining and performing a charging strategy according to the second data packet, in which the charging strategy includes at least one of: the first electronic device receiving power supply from the second electronic device, and the first electronic device supplying power to the second electronic device.

In a second aspect, embodiments of the disclosure provide a charging control method, applicable for a second electronic device connected with a first electronic device through a preset charging cable, and the method includes:
  receiving a first data packet sent by the first electronic device, in which, the first data packet includes to-be-charged identification information and first characteristic information of the first electronic device;
  generating a corresponding second data packet according to the first data packet, in which the second data packet includes power supply identification information and charging strategy information, a charging strategy represented by the charging strategy information includes at least one of: the second electronic device performing power supply for the first electronic device, or the second electronic device receiving power supply from the first electronic device;
  sending the second data packet.

In a third aspect, embodiments of the disclosure provide an electronic device. The electronic device includes:
  a processor;
  a memory for storing executable instructions by the processor; in which,
  when the instructions are executed by the processor, the processor is configured to:
  receive a first data packet sent by the first electronic device, in which, the first data packet includes to-be-charged identification information and first characteristic information of the first electronic device;
  generate a corresponding second data packet according to the first data packet, in which, the second data packet includes power supply identification information and charging strategy information, a charging strategy represented by the charging strategy information includes the second electronic device performing power supply for the first electronic device, or the second electronic device receiving power supply from the first electronic device;
  send the second data packet.

It should be understood that the above general description and the following detailed description are only exemplary and explanatory, and cannot limit the present disclosure.

BRIEF DESCRIPTION OF THE DRAWINGS

The drawings herein are incorporated into the specification and constitute a portion of the specification and illustrate embodiments in accordance with the disclosure, and the drawings together with the specification are used to explain the principle of the disclosure.

FIG. 9 is a schematic diagram illustrating a second data package according to an embodiment of the present disclosure.

FIG. 10 is a schematic diagram illustrating a first configuration information according to an embodiment of the present disclosure.

FIG. 11 is a schematic diagram illustrating a second configuration information according to an embodiment of the present disclosure.

DETAILED DESCRIPTION

Figure 1:
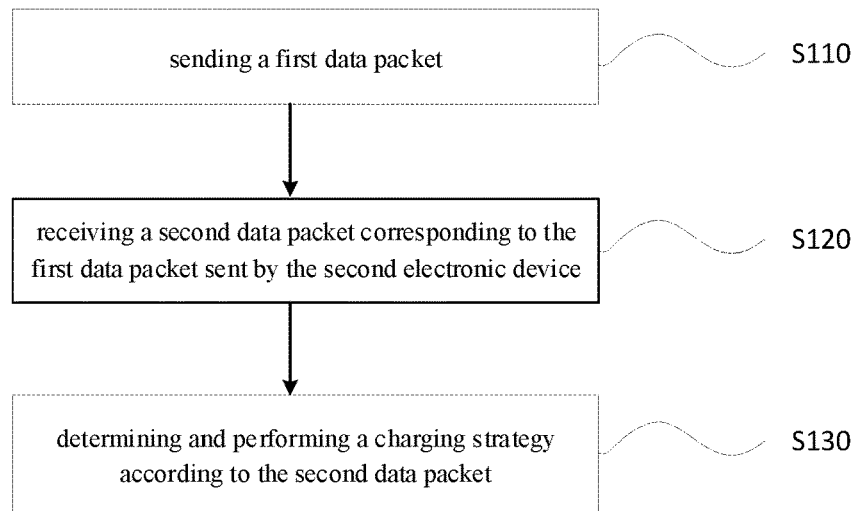
FIG. 1 is a flowchart illustrating a charging control method according to an embodiment of the present disclosure.

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the present disclosure. Instead, they are merely examples of apparatuses and methods consistent with aspects related to the present disclosure as recited in the appended claims.

With development of technologies, mobile phones and other electronic devices have additional functions and increasing hardware power consumption, causing the mobile phones and other electronic devices to consume power more rapidly. In related scenarios, such as when a user is outdoors or on a journey, an environment where the user is located is not convenient for charging the mobile phones or other electronic devices with a charger.

In related arts, two mobile phones each other may perform wired charging. For example, two mobile phones may be connected through a type-c to type-c (c to c) cable, a random one of the two mobile phones is used as a source and the other one is used as a sink, and the two mobile phones charge by following charging power negotiated in accordance with a PD (Power Delivery) protocol. The c to c cable refers to a charging cable with type c interfaces at both ends of the charging cable, which may be configured to connect two electronic devices with type c ports.

However, in the related arts, during a process of using two mobile phones to charge each other, a charging direction is random. Therefore, there are disadvantages that a mobile phone with low electricity quantity charges a mobile phone with high electricity quantity, and the user requires to plug and unplug a connection multiple times to achieve a purpose of charging a target mobile phone, which is inconvenient for usage.

In addition, the solution of inter-charging in the related arts cannot continuously monitor status of the two mobile phones, and cannot adjust the charging direction or charging status of the two mobile phones in time according to the status of the mobile phones.

In order to solve the above technical problems, the present disclosure provides a charging control method, applicable for a first electronic device. The method includes: sending a first data packet; receiving a second data packet corresponding to the first data packet sent by the second electronic device; determining and performing a charging strategy according to the second data packet. With the method of the present disclosure, after the first electronic device and the second electronic device are connected by the charging cable, the first electronic device and the second electronic device may interact and communicate charging data, and then determine a charging strategy. A target mobile phone may be accurately determined and charged, which may effectively avoid the disadvantages caused by the charging solution of the charging direction being random in the related arts, without requirements for repeatedly plugging and unplugging the charging cable. The charging direction may be determined with one time of connection, and a process of inter-charging is more convenient and efficient.

In an embodiment, the charging control method of this embodiment is applied for the first electronic device. For example, the first electronic device may be a portable electronic device such as a mobile phone, a notebook computer, a tablet computer, a smart watch or a Bluetooth headset. This method is executed by the electronic device as the sink. It may be understood that the electronic device as the sink refers to a sink device at an initial moment when the charging cable is connected, or an initial sink device during each communication process. In this embodiment, this method may be executed by, for example, a CPU (central processing unit) of the first electronic device.

In this embodiment, the first electronic device and the second electronic device are connected through a preset charging cable. The preset charging cable may be, for example, the c to c cable (both ends of the charging cable are the type c interfaces). For example, when users have requirements for inter-charging, the mobile phone M1 and the mobile phone M2 are connected through the c to c cable. At the initial moment of connection, the random one is the sink and the other one is the source. It is assumed that the mobile phone M1 is the sink and the mobile phone M2 is the source at the initial moment. In this embodiment, it is defined that the sink device at the initial moment is the first electronic device, and the source device at the initial moment is the second electronic device. For example, the mobile phone M1 is the first electronic device and the mobile phone M2 is the second electronic device. When the first electronic device and the second electronic device are connected through the preset charging cable, the second electronic device sends manufacturer identification information by default.

As illustrated in FIG. 1, the method according to this embodiment includes the following blocks.

At block S110, a first data packet is sent.

At block S120, a second data packet corresponding to the first data packet sent by the second electronic device is received.

At block S130, a charging strategy is determined and performed according to the second data packet.

Figure 12:
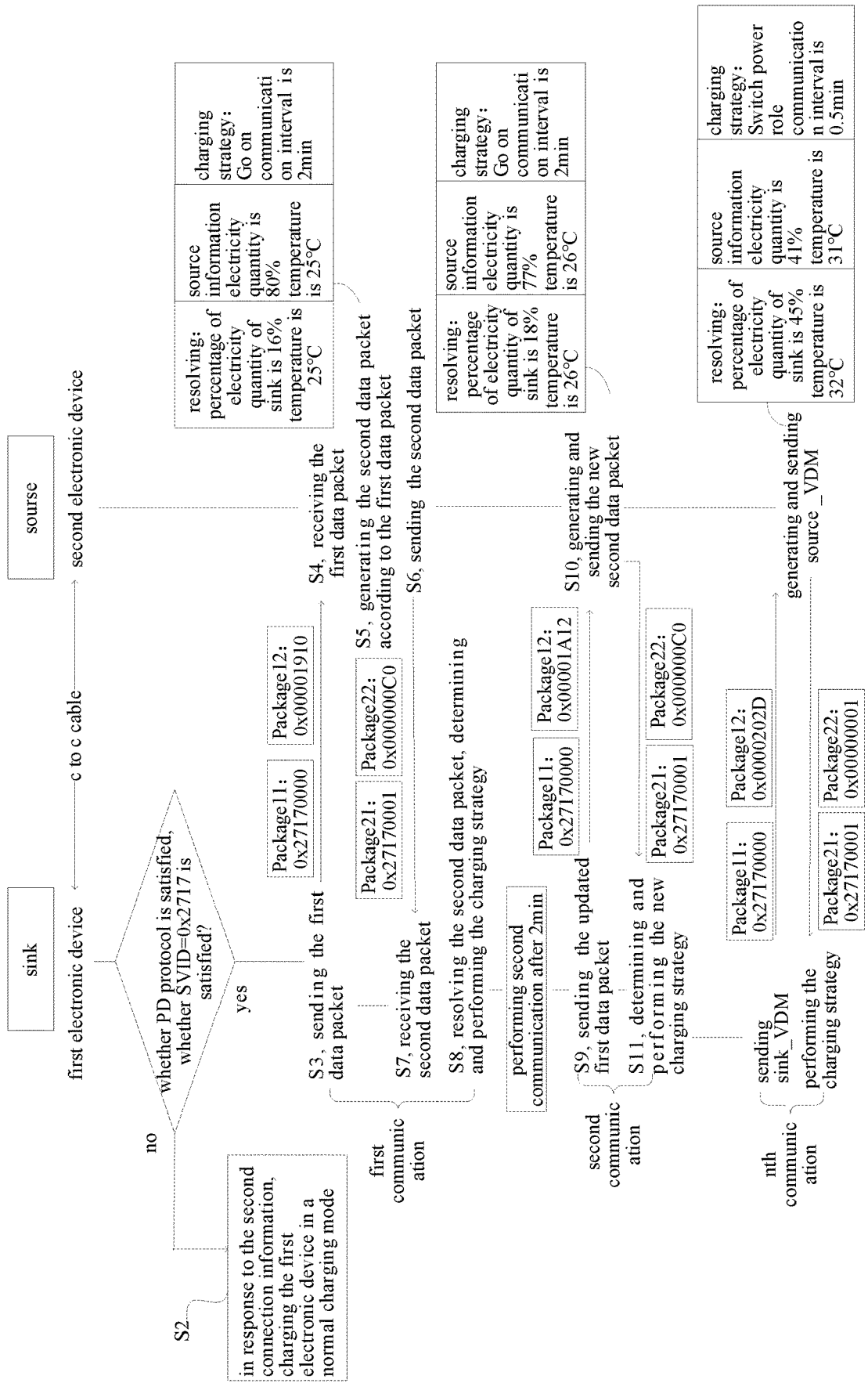
FIG. 12 is a schematic diagram illustrating interactions between a first electronic device and a second electronic device according to an embodiment of the present disclosure.

In the block S110, combining with FIG. 12, when the first electronic device detects that one end of the preset charging cable is plugged (the other end of the preset charging cable is connected to the second electronic device), the first electronic device checks a charging protocol and determine whether the manufacturer identification information sent by the electronic device satisfies preset identification information.

In this block, when first connection information is satisfied, intelligent inter-charging communication is performed after the first electronic device and the second electronic device are connected. The first connection information may be as a signal for being able to perform a mode for intelligent inter-charging. The first connection information may at least include a charging protocol satisfying a preset protocol. In this embodiment, the preset protocol may be, for example, a new PD protocol that is improved on the basis of an original PD protocol, and may send interactive information (the first data packet or the second data packet) based on the new PD protocol. The first connection information may further include that the manufacturer identification information of the second electronic device satisfies preset identification information. The preset identification information may be, for example, the manufacturer identification information of the first electronic device, that is, the mode for intelligent inter-charging is performed when the manufacturer identification of the first electronic device and the second electronic device are the same.

In an example, when the charging protocol of the preset charging cable satisfies the preset protocol, the first electronic device may initiate the intelligent inter-charging communication and send the first data packet. In another example, when the charging protocol of the preset charging cable satisfies the preset protocol, and the manufacturer identification of the second electronic device is the same as the manufacturer identification of the first electronic device, the first electronic device may initiate the intelligent inter-charging communication and send the first data packet. It is understandable that in other examples, the first connection information may be self-set in combination with product functions.

In this block, the first data packet may be a data packet in a form of VDM (Vendor Defined Message), which is defined as sink_VDM. VDM is a kind of data packet reserved in the PD protocol, and a method of application of the VDM may be defined by the manufacturer. In this embodiment, the first data packet includes identification information and first characteristic information of the first electronic device. The identification information of the first electronic device may include, for example, manufacturer identification information and power role identification information. The power role is used to represent that a state of the first electronic device or the second electronic device is a charging state or a power supply state, that is, the power role refers to the sink or the source. The power role identification information of the first electronic device is to-be-charged identification information, which represents that the first electronic device is the sink.

The first data packet (sink_VDM) includes two sub-packages (package11 and package12). Each sub-package includes 32 bits. Each bit is represented by a binary number (0 or 1). Meaning of each bit may be self-set according to actual requirements.

For example, there are two power roles, a single bit of "0 or 1" may effectively distinguish the power roles, so any one bit in the package11 or the package12 may be used to represent the power roles. The manufacturer identification is generally represented by four digits in hexadecimal (which may be converted into 16 digits in binary), so 16 bits in the package11 or the package12 require to be reserved to represent the manufacturer identification. The first characteristic information includes two factors of temperature and electricity quantity. The temperature or electricity quantity are generally two-digit numbers. Therefore, 8 bits require to be reserved for temperature or electricity quantity, and the first characteristic information requires a total of 16 bits to represent. Meanings of the remaining bits may be adjusted according to actual requirements, for example, the bits may be set to represent CPU load status. The meaning of each bit of the two sub-packages such as the package11 and the package12 in the first data packet may be configured according to the above principles.

Figures 7, 8:
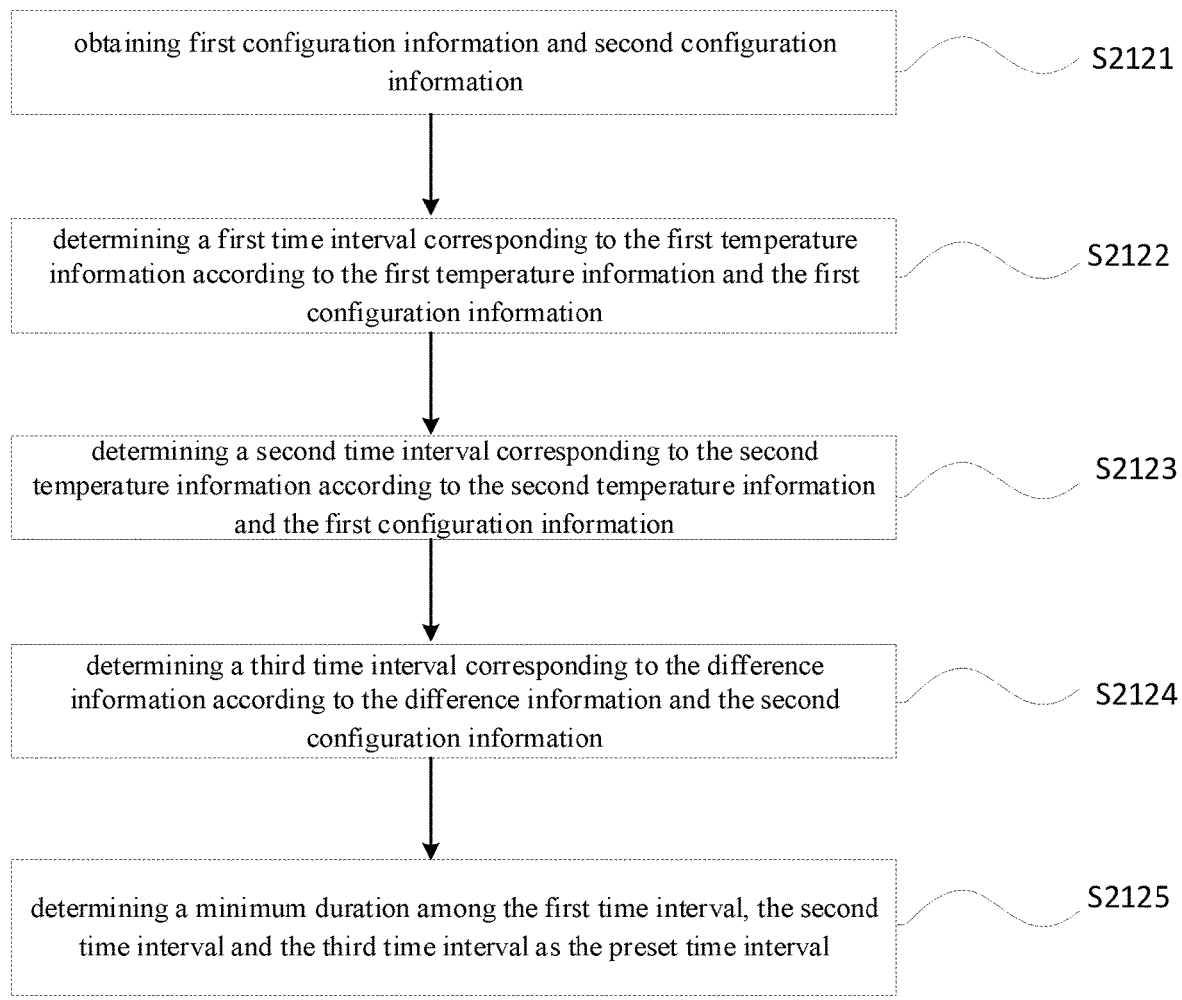
FIG. 7 is a flowchart illustrating a charging control method according to an embodiment of the present disclosure.
FIG. 8 is a schematic diagram illustrating a first data package according to an embodiment of the present disclosure.

For example, composition of the first data packet in this embodiment is as illustrated in FIG. 8. The "reserved" in the figure represents that the meaning of the corresponding bit is not defined in this embodiment.

The bit of Bit0 in the package11 represents the power role identification information, for example, the bit0 being 0 represents the to-be-charged identification information, which means that the first electronic device is the sink and the data sent by the first electronic device is the first data packet (sink_VDM). The bits of bit16-bit31 represent the manufacturer identification information (SVID) of the first electronic device. The SVID is the identification ID assigned to each manufacturer by a PD standard organization, which includes 16 bits. For example, it is assumed that the SVID of manufacturer A to which an electronic device belongs is 0x2717 (0x means hexadecimal).

The bits of bit0-bit7 in the Package12 represent a percentage of electricity quantity of the first electronic device, and the bits of bit8-bit15 represent the overall temperature of the first electronic device.

The electricity quantity may refer to SOC (state of charge) of the battery.

In block S120, the second data packet is generated by the second electronic device according to the received first data packet, and sent based on the wired connection and the preset protocol. The first electronic device may receive the second data packet. For example, the second data packet includes the charging strategy determined according to the characteristic information of the first electronic device.

In block S130, the charging strategy is configured to represent whether to receive power supply from the second electronic device. For example, the charging strategy includes at least one of the first electronic device receiving power supply from the second electronic device, and the first electronic device supplying power to the second electronic device. In this block, after receiving the second data packet, the first electronic device may determine the charging strategy included in the second data packet by resolving the second data packet.

In an example, when the charging strategy included in the second data packet is receiving charging from the second electronic device, the first electronic device may execute the charging strategy accordingly. For example, the charging strategy executed by the mobile phone M1 at this time is receiving power supply from the mobile phone M2.

In another example, when the charging strategy included in the second data packet is to not receive charging from the second electronic device, the solution for no receiving the charging from the second electronic device may include the following two methods. In a first way, the mobile phone M1 has more electricity quantity, so the mobile phone M1 requires to switch the power role with the mobile phone M2, that is, the mobile phone M1 switches from the sink to the source, and the mobile phone M1 charges for the mobile phone M2. In a second way, the mobile phone M1 has a risk factor for charging the mobile phone M2, and the second electronic device stops charging. The risk factor may be, for example, that the first electronic device or the second electronic device is in a poor state, have low electricity quantity, or high temperature during the process of inter-charging. Stop charging may effectively avoid danger.

Blocks S110 to S130 represent one time of intelligent inter-charging communication between the first electronic device and the second electronic device. In this embodiment, a time interval of each time of communication is about 0.3 seconds. Therefore, even if at the initial moment when the mobile phone M1 and the mobile phone M2 are connected through the charging cable, the sink and the source are random, the charging strategy may still be adjusted in time according to the method of the present disclosure, so as to accurately charge the target mobile phone without requirements for repeatedly plugging and unplugging the charging cable. An accuracy charging direction may be quickly determined on the basis of once connection, and a disadvantage solution of charging the mobile phone with high electricity quantity by the mobile phone with low electricity quantity may be avoided.

Figure 2:
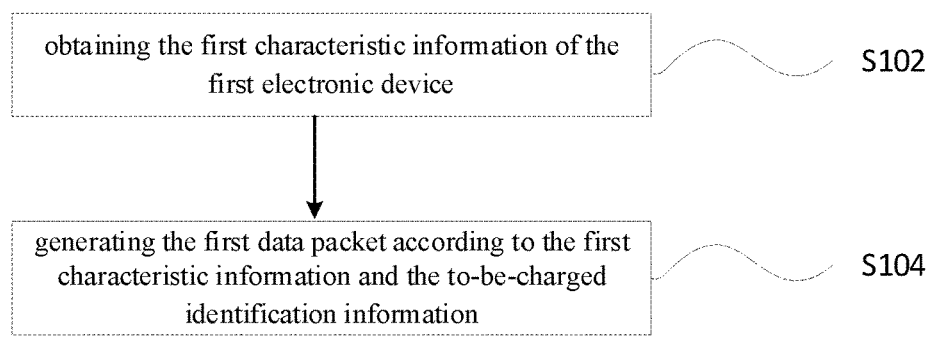
FIG. 2 is a flowchart illustrating a charging control method according to an embodiment of the present disclosure.

In an embodiment, as illustrated in FIG. 2, before block S110, the method of this embodiment further includes the following blocks.

S102, the first characteristic information of the first electronic device is obtained.

S104, the first data packet is generated according to the first characteristic information and the to-be-charged identification information.

In block S102, the CPU of the first electronic device obtains its own first characteristic information, and the first characteristic information includes first temperature information and first electricity quantity information. The first temperature information may be, for example, the overall temperature information of the first electronic device, which may be detected by a temperature sensor provided inside the mobile phone; the first electricity quantity information may be, for example, current electricity quantity information of the first electronic device.

In block S104, the first electronic device generates the first data packet according to the obtained first characteristic information and to-be-charged identification information. It is understandable that the first data packet may also include the manufacturer identification information. As illustrated in FIG. 8, the first characteristic information may be filled into the package12, and the identification information (including the manufacturer identification information and the to-be-charged identification information) may be filled into the package11. The bit of bit0 in the package11 is set as 0, indicating that this VDM is sink_VDM.

Figure 3:
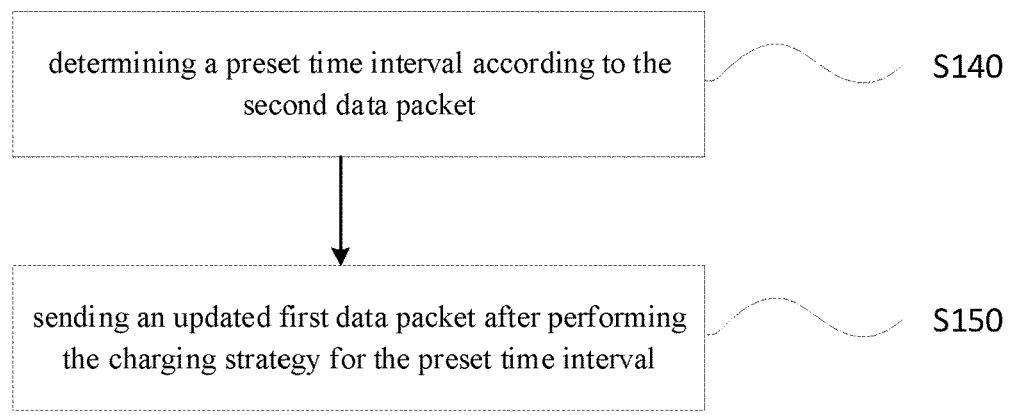
FIG. 3 is a flowchart illustrating a charging control method according to an embodiment of the present disclosure.

In an embodiment, as illustrated in FIG. 3, when the charging strategy is to receive power supply from the second electronic device, the method of this embodiment further includes the following blocks.

At block S140, a preset time interval is determined according to the second data packet.

At block S150, an updated first data packet is sent after the charging strategy is performed for the preset time interval In this embodiment, after a first time of communication, and when the charging strategy is to receive power supply from the second electronic device, when to start a second time of communication may be determined and considered as the time to execute the charging strategy.

In block S140, the second data packet further includes a performing time when the charging strategy is to receive power supply from the second electronic device, that is, the time interval for performing the next intelligent inter-charging communication. The first electronic device may determine the preset time interval by resolving the second data packet after receiving the second data packet.

In block S150, after the charging strategy is performed for the preset time interval (or after the last communication is completed the preset time interval), the first electronic device may initiate communication again, that is, send the updated first data packet. For example, the updated first data packet includes current first characteristic information (current first temperature information and current first electricity quantity information of the first electronic device).

After block S150, with reference to FIG. 12, in this embodiment, after the updated first data packet is sent to the second electronic device, the second electronic device generates a new second data packet (including a new charging strategy) according to the updated first data packet and the re-determined preset time interval, to complete a new communication for one-time. The first data packet of each time of communication has the corresponding second data packet. For example, and so forth, the first electronic device and the second electronic device may complete multiple times of communications according to the corresponding preset time intervals.

In an embodiment, the charging control method of this embodiment is applied for a second electronic device. For example, the second electronic device may be a portable electronic device such as a mobile phone, a notebook computer, a tablet computer, a smart watch or a Bluetooth headset. This method is executed by the electronic device as the source. It may be understood that the electronic device as the source refers to a source device at an initial moment when the charging cable is connected, or an initial source device during each communication process. In this embodiment, this method may be executed by, for example, a CPU (central processing unit) of the second electronic device.

Figure 4:
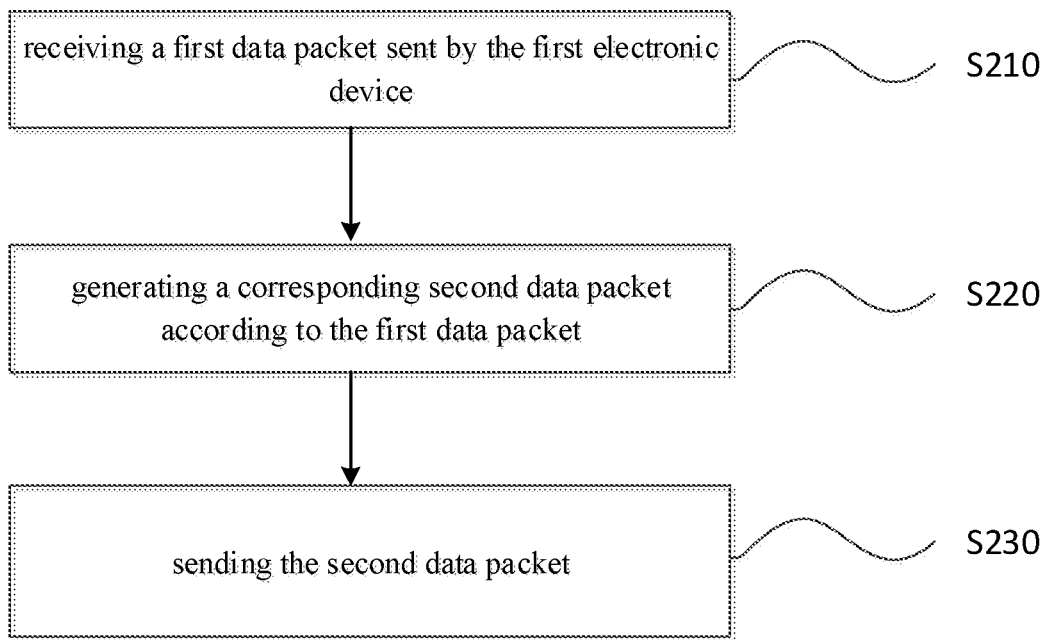
FIG. 4 is a flowchart illustrating a charging control method according to an embodiment of the present disclosure.

As illustrated in FIG. 4, the method according to this embodiment includes the following blocks.

At block S210, a first data packet sent by the first electronic device is received.

At block S220, a corresponding second data packet is generated according to the first data packet.

At block S230, the second data packet is sent.

In block S210, the first data packet includes the to-be-charged identification information and the first characteristic information of the first electronic device. The first characteristic information may include, for example, first temperature information and first electricity quantity information of the first electronic device.

In block S220, the second data packet includes power supply identification information and charging strategy information. The charging strategy represented by the charging strategy information is used to represent whether the second electronic device performs power supply. For example, the charging strategy includes the second electronic device performing power supply for the first electronic device, or the second electronic device receiving power supply from the first electronic device.

The second data packet may be, for example, a data packet in the form of VDM, which is defined as source_VDM. The second data packet (source_VDM) includes two sub-packages (package21 and package22). Each sub-package includes 32 bits. The meaning of each bit may be set according to the above-mentioned configuration principle of the first data packet. In addition, the second data packet involves a specific charging strategy and a preset time interval. As mentioned above, there are three charging strategies that may be involved in this embodiment, so two bits may achieve a purpose of representing three different strategies. Similarly, when there are three possibilities for the preset time intervals, two bits may be used to represent the three preset time intervals.

In this embodiment, as illustrated in FIG. 9, the bit of bit0 in the package21 represents power role identification information. For example, bit0 being 1 represents the power supply identification information, which means that the second electronic device is the source and the data sent by the second electronic device is the second data packet (source_VDM). The bits of bit16-bit31 represent the manufacturer identification information (SVID) of the second electronic device. The "reserved" in the figure means that the meaning of the corresponding bit is not defined in this embodiment.

The bits of bit0-bit1 in the package22 represent the charging strategy determined by the second electronic device. The strategy represented by "00" is for the second electronic device to perform power supply (Go on), the strategy represented by "01" is to switch power role, and the strategy represented by "10" is for the second electronic device to stop power supply (or stop charge). The bits of bit2-bit3 represents the preset time interval of communication when corresponding to the go on strategy. "00" represents 0.5 min, "01" represents 1 min, and "11" represents 2 min.

In block S230, the second electronic device sends the generated second data packet to the first electronic device based on a preset protocol.

Figure 5:
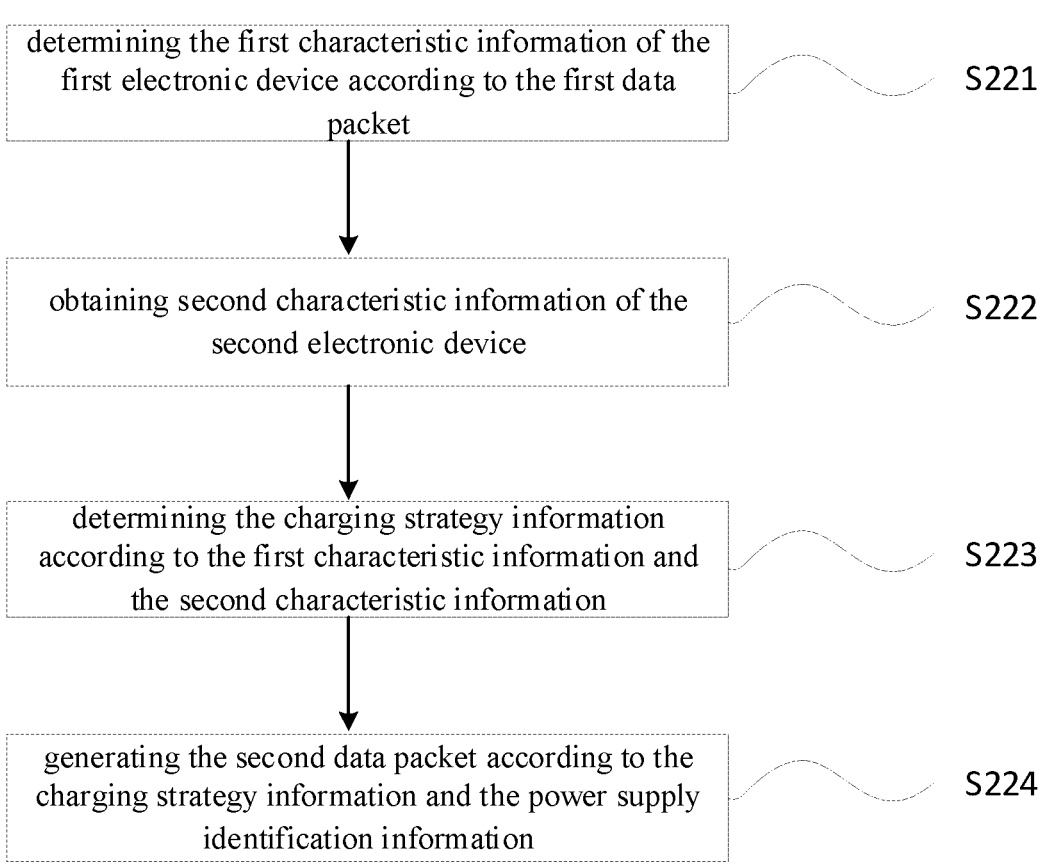
FIG. 5 is a flowchart illustrating a charging control method according to an embodiment of the present disclosure.

In an embodiment, as illustrated in FIG. 5, block S220 specifically includes the following blocks.

At block S221, the first characteristic information of the first electronic device is determined according to the first data packet.

At block S222, second characteristic information of the second electronic device is obtained.

At block S223, the charging strategy information is determined according to the first characteristic information and the second characteristic information.

At block S224, the second data packet is generated according to the charging strategy information and the power supply identification information.

In block S221, the first data packet includes the first characteristic information of the first electronic device, and the second electronic device resolves the received first data packet and may obtain the first characteristic information. The first characteristic information includes the first temperature information and the first electricity quantity information.

In block S222, the second electronic device obtains its own second characteristic information, where the second characteristic information includes the second temperature information and the second electricity quantity information. The second temperature information may be, for example, the overall temperature information of the second electronic device, which may be detected by a temperature sensor provided inside the device. The second electricity quantity information may be, for example, current electricity quantity information of the second electronic device.

In block S223, it may be determined whether a current state of the first electronic device is healthy or good according to the first temperature information and the first electricity quantity information. For example, when the temperature represented by the first temperature information is higher than a first threshold, it indicates that the state of the first electronic device is unhealthy and is not suitable for inter-charging. It may be determined whether a current state of the second electronic device is healthy or good according to the second temperature information and the second electricity quantity information. For example, when the percentage of electricity quantity represented by the second power information is lower than a second threshold, it indicates that the state of the second electronic device is unhealthy and is not suitable for inter-charging. The first electronic device may be further determined according to the CPU load.

In block S224, the second electronic device generates the second data packet according to the determined charging strategy information and identification information. In combination with the FIG. 9, the charging strategy information may be filled into the package22, and the identification information may be filled into the package21. The identification information includes manufacturer identification information of the second electronic device and power role identification information. For example, the power role identification information of the second electronic device at this time is the power supply identification information.

Figure 6:
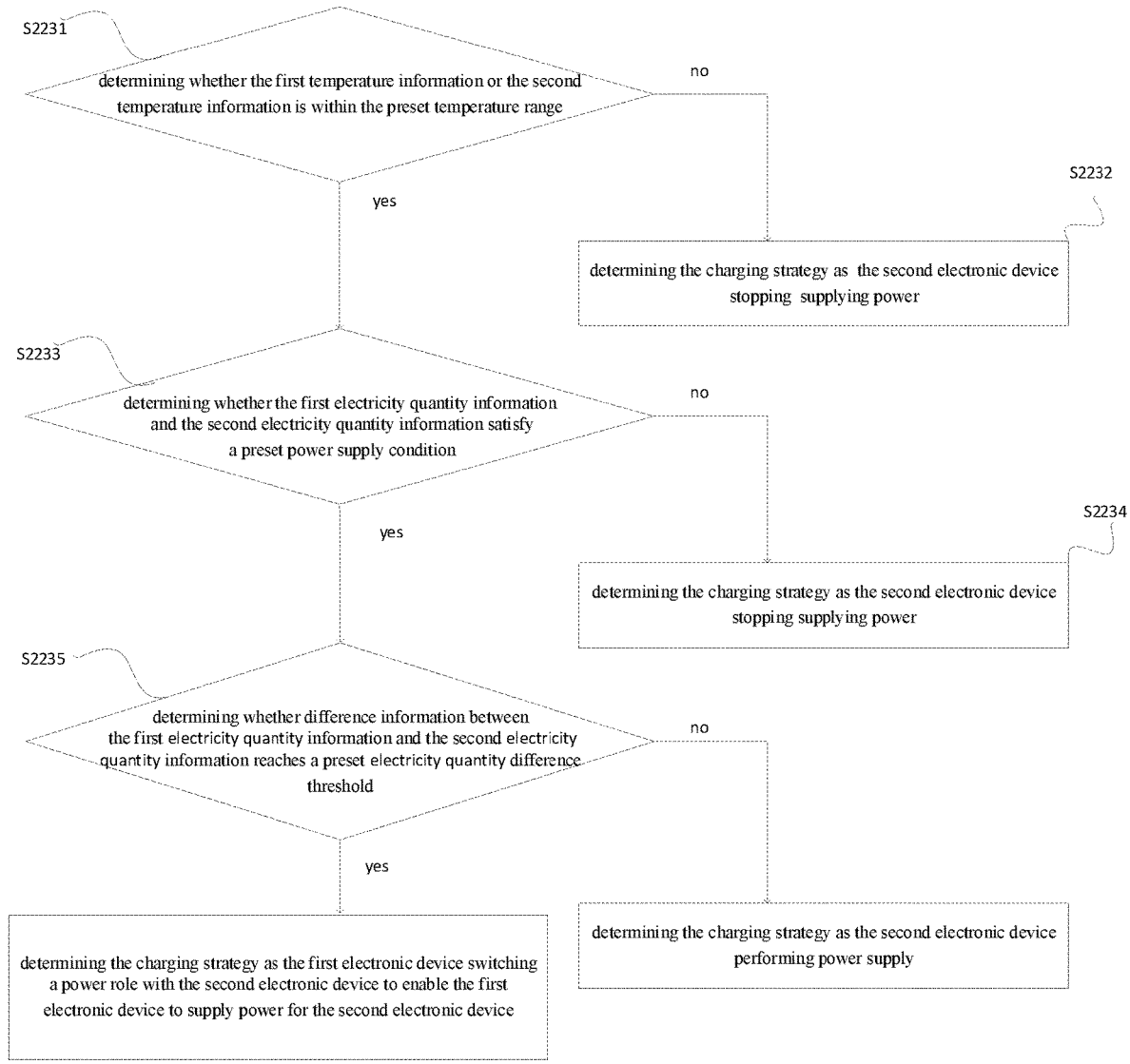
FIG. 6 is a flowchart illustrating a charging control method according to an embodiment of the present disclosure.

In an embodiment, as illustrated in FIG. 6, the block S223 may specifically include the following blocks.

At block S2231, whether the first temperature information or the second temperature information is within a preset temperature range is determined. If yes, that is, when the first temperature information or the second temperature information is within the preset temperature range, block S2233 is executed; if not, block S2232 is executed.

At block S2232, in response to the first temperature information or the second temperature information being outside the preset temperature range, the charging strategy is determined as the second electronic device stopping supplying power (or stop charge). Prevent the phone from overheating.

At block S2233, whether the first electricity quantity information and the second electricity quantity information satisfy a preset power supply condition. If yes, that is, when the first electricity quantity information and the second electricity quantity information satisfy the preset power supply condition, block S2235 is executed; if not, block S2234 is executed.

At block S2234, in response to the first electricity quantity information and the second electricity quantity information not satisfying a preset power supply condition, the charging strategy is determined as the second electronic device stopping supplying power (or stop charge). Prevent insufficient power supply caused by the mobile phone with low electricity quantity supplying power to outside.

At block S2235, it is determined whether difference information between the first electricity quantity information and the second electricity quantity information reaching a preset electricity quantity difference threshold.

If yes, that is, difference information between the first electricity quantity information and the second electricity quantity information reaching the preset electricity quantity difference threshold, the charging strategy is determined as the first electronic device switching a power role with the second electronic device to enable the first electronic device to supply power for the second electronic device. At this time, the first electronic device (mobile phone M1) requires to switch the power role with the second electronic device (mobile phone M2), that is, the mobile phone M1 switches from sink to source for supplying power to the mobile phone M2.

If not, that is, the difference information does not reach the preset electricity quantity difference threshold, the charging strategy is determined as the second electronic device performing power supply (Go on).

In block S2231, the preset temperature range may be, for example, [−10° C., 45° C.].

In block S2233, the preset power supply condition may be, for example, that the percentage of the electricity quantity is not less than 30%.

In block S2235, the preset electricity quantity difference threshold may be, for example, 3%. Or, the preset electricity quantity difference threshold is set to a range of 3%-5%. The setting of the preset electricity quantity difference threshold may eliminate interferences of a lower electricity quantity difference threshold (for example, less than 3%), and prevent frequently switching of power roles between the two mobile phones when the electricity quantity of the first electronic device is close to that of the second electronic device.

In an embodiment, when the charging strategy is the second electronic device performing power supply for the first electronic device, after block S210, the method of this embodiment further includes the following block.

At block S212, a preset time interval is determined according to the first characteristic information and the second characteristic information.

The block S220 executes the following method: the second data packet is generated according to the first data packet and the preset time interval.

That is, in block S220, in addition to the charging strategy, the second data packet also includes time interval information for executing the strategy, that is, the preset time interval. The time interval information may also represent the time interval information of one time of the intelligent inter-charging communication.

In block S212, time intervals respectively corresponding to the first temperature information, the second temperature information and the difference information is determined according to the first temperature information, the second temperature information and the difference information between the first electricity quantity information and the second electricity quantity information. A minimum duration among the corresponding time intervals is determined as the preset time interval.

In an embodiment, as illustrated on FIG. 7, the block S210 further includes the following blocks.

At block S2121, first configuration information and second configuration information are obtained.

At block S2122, a first time interval corresponding to the first temperature information is determined according to the first temperature information and the first configuration information.

At block S2123, a second time interval corresponding to the second temperature information is determined according to the second temperature information and the first configuration information.

At block S2124, a third time interval corresponding to the difference information is determined according to the difference information and the second configuration information.

At block S2125, a minimum duration among the first time interval, the second time interval and the third time interval is determined as the preset time interval.

In the block S2121, the first configuration information is configured to represent a corresponding relationship between temperature intervals and time intervals. In a process of dividing the preset temperature range into multiple temperature intervals, it may be based on a principle of "the closer to a danger temperature, the shorter a length of the temperature interval". For example, the lengths of the temperature intervals set near upper and lower limits of the preset temperature range are smaller, such that the first electronic device and the second electronic device may directly communicate more frequently. Therefore, dangerous situations may be found timely and accurately. The length of the remaining temperature intervals may be set according to actual requirements.

In this embodiment, as illustrated in FIG. 10, the preset temperature range [−10° C., 45° C.] is set as multiple temperature intervals, and the lengths of the temperature intervals set near the upper and lower limits of the preset temperature range are smaller. The high temperature threshold intervals (for example: (40° C., 45° C.]) and the low temperature threshold intervals (for example: [−10° C., −5° C.]) are divided more accurately. When the temperature of the electronic device is in the high temperature threshold interval or the low temperature threshold interval, the electronic device is considered to be in an unhealthy state and may be dangerous. Therefore, the time interval corresponding to this type of temperature interval is short (for example, 0.5 min) so as to achieve more frequent communication between the first electronic device and the second electronic device, which facilitates timely detection of danger and timely adjustment of the charging strategy. The lengths of the remaining temperature intervals may be adapted to increase, and the corresponding time intervals may also be adapted to increase (for example, 1 or 2 min).

The second configuration information is configured to represent a correspondence relationship between difference intervals in electricity quantity and time intervals. In a process of dividing the difference intervals in electricity quantity, it may be based on a principle of "the smaller the difference in electricity quantity, the more frequent the communication" to achieve a purpose of stopping charging in time. The length of the remaining difference intervals in electricity quantity may be set according to actual requirements.

In this embodiment, as illustrated in FIG. 11, three difference intervals in electricity quantity are set according to the range (3%-5%) of the preset electricity quantity difference threshold. The length of the difference interval close to the range of the preset electricity quantity difference threshold is smaller, and when the electricity quantity of the electronic device is in thus interval, the electronic device is considered to be in the unhealthy state. Therefore, the time interval corresponding to thus interval is relatively short (for example, 0.5 min), so as to realize more frequent communication between the first electronic device and the second electronic device, which facilitates timely detection of danger and timely adjustment of the charging strategy. The length of the remaining difference intervals may be increased, and the corresponding time intervals may also be adjusted (for example, 1 or 2 min).

In an example, as illustrated in FIG. 12, this embodiment illustrates the communication process of intelligent inter-charging when the first electronic device and the second electronic device are connected based on the c to c cable.

At block S1, when detecting that one end of the preset charging cable is plugged, the first electronic device checks whether the charging protocol satisfies the preset protocol (such as the PD protocol), and determines whether the manufacturer identification information of the second electronic device (source) satisfies the preset identification information (for example, 0x2717).

If yes, that is, the charging protocol satisfies the preset protocol, and the manufacturer identification information of the second electronic device satisfies the preset identification information (denoted as the first connection information), go to block S3;

If not, that is, the charging protocol does not satisfy the preset protocol, or the manufacturer identification information of the second electronic device does not satisfy the preset identification information (denoted as the second connection information), go to block S2.

At block S2, in response to the second connection information, the first electronic device is charged in a normal charging mode and reports to an UI (User Interface).

At block S3, in response to the first connection information, the first electronic device sends the first data packet (block S110). For example, the package11 of the first data package (sink_VDM) is 0x27170000, and the package12 of that is 0x00001910.

At block S4, the second electronic device receives the first data packet (block S210).

At block S5, the second electronic device generates the second data packet (source_VDM) according to the first data packet (Step S220).

At block S51, the first characteristic information is determined by resolving the first data packet (block S221).

In this example, the first data packet is "0x00001910". By resolving the package12, it may be known that the percentage of the electricity quantity of the first electronic device (sink) is 16% and the temperature of the first electronic device is 25° C.

The 0x in 0x00001910 indicates that the data is hexadecimal data. Therefore, in the resolving process, each number in "00001910" after 0x is converted into a binary number (that is, each number contains 4 bits), and 32 bits of data is obtained, the first bit of the 32 bits of data represents a bit of bit 31, the last bit of that represents a bit of bit0.

The binary number corresponding to "19" (hexadecimal) is "0001 1001", and the meaning represented by the "0001 1001" is the temperature of the first electronic device (see the meaning of bit15-bit8 of the package12 in FIG. 8). When the bit15 is 0, it is represented that the temperature is positive; a decimal number corresponding to "19" (hexadecimal) is "25", thus the temperature is 25° C.

Similarly, the meaning of the binary number corresponding to "10" (hexadecimal) is the percentage of electricity quantity of the first electronic device (see the meaning of bit7-bit0 of the package12 in FIG. 8). The decimal number corresponding to "10" (hexadecimal) is "16", thus the percentage of electricity quantity is 16%.

The resolving process of other VDM data packets involved in the figure may refer to this example.

At block S52, the second electronic device (source) obtains its own second characteristic information (block S222).

In this example, the second characteristic information of the second electronic device includes: the electricity quantity is 80%, and the temperature of the whole machine is 25° C.

At block S53, the second electronic device determines the charging strategy according to the first characteristic information and the second characteristic information (block S223).

In this example, with reference to the manner in FIG. 6, the determined charging strategy is the second electronic device performing power supply (Go on). The preset time interval is determined based on block S212, according to the charging strategy.

The temperature of the first electronic device is the same as the temperature of the second electronic device, both are 25° C. With reference to the first configuration information of FIG. 10, it is determined that the first time interval and the second time interval are both 2 minutes. The difference in the electricity quantity between the first electronic device and the second electronic device is (80-16)%=64%, and in combination with the second configuration information of FIG. 11, it is determined that the third time interval is 2 minutes. In this example, the three time intervals are the same, and the preset time interval is determined to be 2 minutes.

At block S54, the second data packet is generated (block S224).

At block S6, the second electronic device sends the second data packet.

At block S7, the first electronic device receives the second data packet (block S120).

At block S8, the first electronic device resolves the second data packet, determines and performs the charging strategy of receiving power supply from the second electronic device (Go on) (block S130).

At this point, the first time of the intelligent inter-charging communication is completed.

After the preset time interval of 2 minutes, the second time of the communication starts.

At block S9, the first electronic device sends the updated first data packet.

At block S10, the second electronic device receives and resolves the updated first data packet, determines the new charging strategy, and generates and sends the new second data packet.

At block S11, the first electronic device receives the new second data packet, determines and performs the new charging strategy.

Thus, the second time of the intelligent inter-charging communication is completed.

As illustrated in FIG. 12, it is assumed that in the nth communication in this example, it is determined that the charging strategy is switching power role.

For example, during the first and second communication between the mobile phone M1 and the mobile phone M2, the mobile phone M1 corresponds to the first electronic device, which is the sink, and the mobile phone M2 corresponds to the second electronic device, which is the source. When the charging strategy is "switching the power role", the mobile phone M1 switches to the source, and the mobile phone M2 switches to the sink, and the mobile phone M1 charges the mobile phone M2 to complete the nth communication. After that, when involving continuing communication, M2 will determine whether to initiate a new round of communication based on the actual situation (0.5 min in the figure is for illustration and not for reference).

It may be understood that the foregoing embodiment relates to a solution for intelligent charging each other between two mobile phones connected based on the c to c cable. When there are multiple mobile phones for interacting, such as one source and multiple sinks, at this time, the mobile phone as source requires to receive the first data packets sent by multiple sinks, and determines the charging strategies based on the multiple first data packets. The source may generate one second data packet according to the charging strategies and send to each sink respectively, or the source may generate a second data packet corresponding to the charging strategy of each sink, and each second data packet is sent to the corresponding sink.

Figure 13:
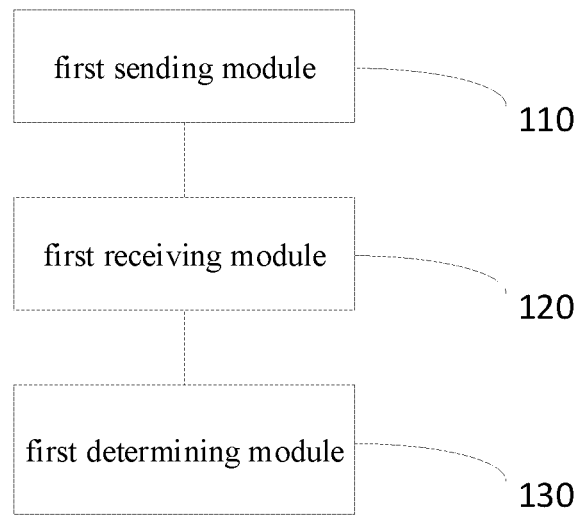
FIG. 13 is a block diagram illustrating a charging control apparatus according to an embodiment of the present disclosure.

In an embodiment, the present disclosure also provides a charging control apparatus, applicable for a first electronic device connected with a second electronic device through a preset charging cable. As illustrated in FIG. 13, the apparatus includes a first sending module 110, a first receiving module 120 and a first determining module 130.

The first sending module 110 is configured to send a first data packet, and the first data packet includes to-be-charged identification information and first characteristic information of the first electronic device. The first receiving module 120 is configured to receive a second data packet corresponding to the first data packet sent by the second electronic device, and the second data packet includes power supply identification information and charging strategy information. The first determining module is configured to determine and perform a charging strategy according to the second data packet, and the charging strategy includes that the first electronic device receives power supply from the second electronic device, or the first electronic device supplies power to the second electronic device.

In an embodiment, the apparatus further includes an obtaining module and a first generating module. The obtaining module is configured to obtain the first characteristic information of the first electronic device, the first characteristic information includes first temperature information and first electricity quantity information. The first generating module is configured to generate the first data packet according to the first characteristic information and the to-be-charged identification information. In this embodiment, the first determining module 130 is further configured to determine the charging strategy included in the second data packet by resolving the second data packet.

In an embodiment, when the charging strategy is that the first electronic device receives power supply from the second electronic device, the first determining module 130 is further configured to determine a preset time interval according to the second data packet, and the first sending module 110 is further configured to send an updated first data packet after performing the charging strategy for the preset time interval, the updated first data packet includes current first characteristic information.

Figure 14:
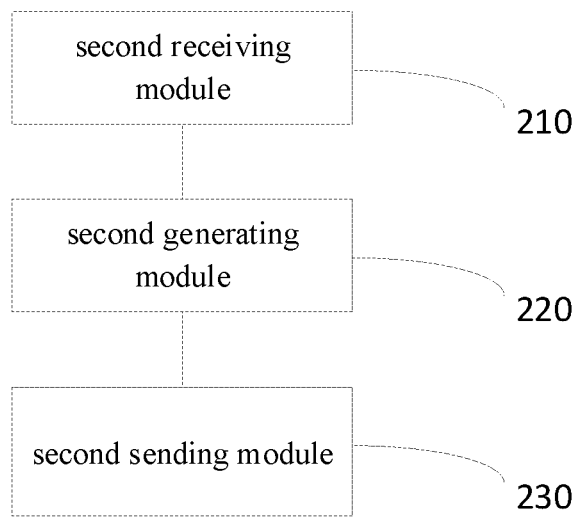
FIG. 14 is a block diagram illustrating a charging control apparatus according to an embodiment of the present disclosure.

In an embodiment, the present disclosure also provides a charging control apparatus, applicable for a second electronic device connected with a first electronic device through a preset charging cable. As illustrated in FIG. 14, the apparatus includes a second receiving module 210, a second generating module 220 and a second sending module 230.

The second receiving module 210 is configured to receive a first data packet sent by the first electronic device, and the first data packet includes to-be-charged identification information and first characteristic information of the first electronic device. The second generating module 220 is configured to generate a corresponding second data packet according to the first data packet, and the second data packet includes power supply identification information and charging strategy information, a charging strategy represented by the charging strategy information includes the second electronic device performing power supply for the first electronic device, or the second electronic device receiving power supply from the first electronic device. The second sending module 230 is configured to send the second data packet.

In an embodiment, the second generating module is further configured to: determine the first characteristic information of the first electronic device according to the first data packet, the first characteristic information includes first temperature information and first electricity quantity information; obtain second characteristic information of the second electronic device, the second characteristic information includes second temperature information and second electricity quantity information; determine the charging strategy information according to the first characteristic information and the second characteristic information; generate the second data packet according to the charging strategy information and the power supply identification information.

In an embodiment, the second generating module is configured to: in response to the first temperature information or the second temperature information being outside the preset temperature range, determine the charging strategy as: the second electronic device stopping supplying power.

In an embodiment, the second generating module is configured to: when the first temperature information or the second temperature information is within the preset temperature range, in response to the first electricity quantity information and the second electricity quantity information not satisfying a preset power supply condition, determine the charging strategy as the second electronic device stopping supplying power.

In an embodiment, the second generating module is configured to: when the first electricity quantity information and the second electricity quantity information satisfies the preset power supply condition, in response to difference information between the first electricity quantity information and the second electricity quantity information reaching a preset electricity quantity difference threshold, determine the charging strategy as the first electronic device switching a power role with the second electronic device to enable the first electronic device to supply power for the second electronic device, and the power role is configured to represent a state of the first electronic device or the second electronic device as a to be charged state or a power supply state; in response to the difference information not reaching the preset electricity quantity difference threshold, determine the charging strategy as the second electronic device performing power supply.

In an embodiment, when the charging strategy is performing the second electronic device performs power supply, the apparatus further includes: a second determining module. The second determining module is configured to determine a preset time interval according to the first characteristic information and the second characteristic information, the preset time interval is configured to represent a time for the second electronic device performing power supply this time when the charging strategy is the second electronic device performing power supply for the first electronic device. The second generating module is configured to: generate the second data packet according to the first data packet and the preset time interval.

In an embodiment, the second determining module is further configured to: determine time intervals respectively corresponding to the first temperature information, the second temperature information and the difference information, according to the first temperature information, the second temperature information and the difference information between the first electricity quantity information and the second electricity quantity information; determine a minimum duration among the corresponding time intervals as the preset time interval.

In this embodiment, the second determining module is further configured to: obtain first configuration information and second configuration information, the first configuration information is configured to represent a corresponding relationship between temperature intervals and time intervals, and the second configuration information is configured to represent a correspondence relationship between difference intervals in electricity quantity and time intervals; determine a first time interval corresponding to the first temperature information according to the first temperature information and the first configuration information; determine a second time interval corresponding to the second temperature information according to the second temperature information and the first configuration information; determine a third time interval corresponding to the difference information according to the difference information and the second configuration information; determine a minimum duration among the first time interval, the second time interval and the third time interval as the preset time interval.

Figure 15:
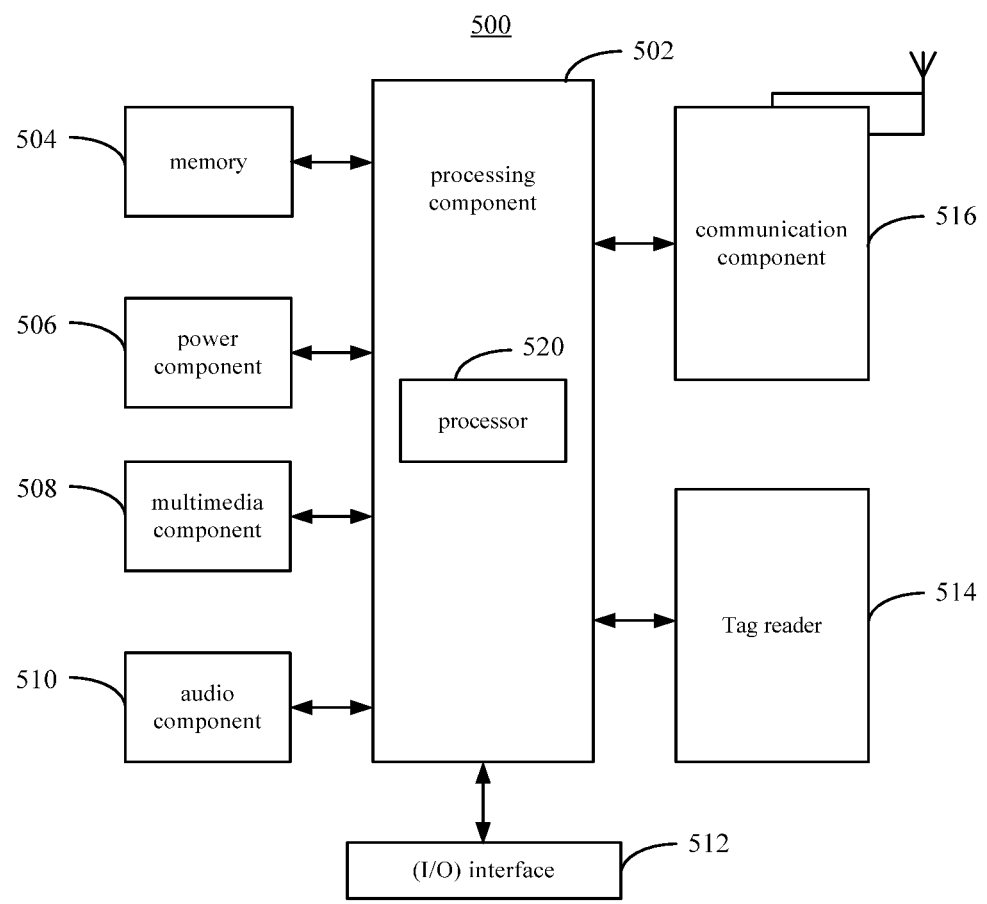
FIG. 15 is a block diagram illustrating an electronic device according to an embodiment of the present disclosure.

FIG. 15 is a block diagram of an electronic device according to an embodiment of the present disclosure. For example, the device may be a mobile phone, a computer, a digital broadcasting terminal, a message transceiver device, a game console, a tablet device, a medical device, a fitness device and a personal digital assistant.

Referring to FIG. 15, a device 500 may include one or more of the following components: a processing component 502, a memory 504, a power component 506, a multimedia component 508, an audio component 510, an input/output (I/O) interface 512, a sensor component 514, and a communication component 516.

The processing component 502 typically controls overall operations of the device 500, such as the operations associated with the current state parameter of the battery, parameter calculation and data communication. The processing component 502 may include one or more processors 520 to execute instructions to perform all or part of the steps in the above described methods. Moreover, the processing component 502 may include one or more modules which facilitate the interaction between the processing component 502 and other components. For example, the processing component 502 may include a multimedia module to facilitate interactions between the multimedia component 508 and the processing component 502.

The memory 504 is configured to store various types of data to support the operation of the device 500. Examples of such data include instructions for any applications or methods operated on the device 500, and state parameters of the device. The memory 504 may be implemented using any type of volatile or non-volatile memory devices, or a combination of the volatile and non-volatile memory devices, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk.

The power component 506 provides power to various components of the device 500. The power component 506 may include a power management system, one or more power sources, and any other components associated with the generation, management, and distribution of power in the device 500.

The multimedia component 508 includes a screen providing an output interface between the device 500 and the user. In some embodiments, the screen may include a liquid crystal display (LCD) and a touch panel (TP). If the screen includes the touch panel, the screen may be implemented as a touch screen to receive input signals from the user. The touch panel includes one or more touch sensors to sense touches, swipes, and gestures on the touch panel. The touch sensors may not only sense a boundary of a touch or swipe action, but also sense a period of time and a pressure associated with the touch or swipe action. In some embodiments, the multimedia component 508 includes a front camera and/or a rear camera. When the device 500 is in an operation mode, such as a shooting mode or a video mode, the front camera and/or the rear camera may receive external multimedia data. Each front camera and each rear camera may be a fixed optical lens system or have focal length and optical zoom capabilities.

The audio component 510 is configured to output and/or input audio signals. For example, the audio component 510 includes a microphone (MIC) configured to receive an external audio signal when the device 500 is in an operation mode, such as a call mode, a recording mode, and a voice recognition mode. The received audio signal may be further stored in the memory 504 or transmitted via the communication component 516. In some embodiments, the audio component 510 further includes a speaker to output audio signals.

The I/O interface 512 provides an interface between the processing component 502 and peripheral interface modules, such as a keyboard, a click wheel, buttons, and the like. The buttons may include, but are not limited to, a home button, a volume button, a starting button, and a locking button.

The sensor component 514 includes one or more sensors to provide status assessments of various aspects of the device 500. For instance, the sensor component 514 may detect an open/closed status of the device 500, relative positioning of components, e.g., the display and the keypad, of the device 500, a change in position of the device 500 or a component of the device 500, a presence or absence of user contact with the device 500, an orientation or an acceleration/deceleration of the device 500, and a change in temperature of the device 500. The sensor component 514 may include a proximity sensor configured to detect the presence of nearby objects without any physical contact. The sensor component 514 may also include a light sensor, such as a CMOS or CCD image sensor, for use in imaging applications. In some embodiments, the sensor component 514 may also include an accelerometer sensor, a gyroscope sensor, a magnetic sensor, a pressure sensor, or a temperature sensor.

The communication component 516 is configured to facilitate communication, wired or wirelessly, between the device 500 and other devices. The device 500 can access a wireless network based on a communication standard, such as Wi-Fi, 2G, or 3G, or a combination thereof. In one embodiment, the communication component 516 receives a broadcast signal or broadcast associated information from an external broadcast management system via a broadcast channel. In one embodiment, the communication component 516 further includes a near field communication (NFC) module to facilitate short-range communications. For example, the NFC module may be implemented based on a radio frequency identity (RFID) technology, an infrared data association (IrDA) technology, an ultra-wideband (UWB) technology, a Bluetooth (BT) technology, and other technologies.

In embodiments, the device 500 may be implemented with one or more application specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic components, for performing the above described methods.

In embodiments, there is also provided a non-transitory computer readable storage medium including instructions, such as included in the memory 504, executable by the processor 520 in the device 500, for performing the above-described methods. For example, the non-transitory computer-readable storage medium may be a ROM, a RAM, a CD-ROM, a magnetic tape, a floppy disc, an optical data storage device, and the like. When the instructions in the storage medium are executed by the processor of the electronic device, the electronic device is caused to perform the above described methods.

Other embodiments of the disclosure are apparent to those skilled in the art in consideration of the specification together with the practice of the disclosure here. The disclosure is intended to cover any variations, usages, or adaptations of the disclosure following the general principles thereof and including common knowledge in the art or common technical measures in the art which are undisclosed in the disclosure. It is intended that the specification and embodiments are explanatory, and the true scope and spirit of the disclosure is indicated by the following claims.

It should be understood that the present disclosure is not limited to the precise structure that has been described above and shown in the drawings, and various modifications and changes may be made without departing from the scope thereof. The scope of the present disclosure is limited only by the appended claims.

What is claimed is:

1. A charging control method, applicable for a first electronic device connected with a second electronic device through a charging cable, and the method comprising:
    sending a first data packet including to-be-charged identification information and first characteristic information of the first electronic device;
    receiving a second data packet sent by the second electronic device, the second data packet including power supply identification information and charging strategy information;
    determining and performing a charging strategy according to the second data packet, wherein the charging strategy comprises at least one of: the first electronic device receiving power supply from the second electronic device, and the first electronic device supplying power to the second electronic device;
    wherein, when the charging strategy is the first electronic device receiving power supply from the second electronic device, the method further comprises:
    determining a preset time interval based on the second data packet;
    sending an updated first data packet after performing the charging strategy for the preset time interval, wherein the updated first data packet comprises current first characteristic information;
    wherein the method further comprises:
    obtaining the first characteristic information of the first electronic device, the first characteristic information including first temperature information and first electricity quantity information;
    generating the first data packet according to the first characteristic information and the to-be-charged identification information.

2. The method according to claim 1, wherein determining the charging strategy according to the second data packet comprises:
    determining the charging strategy identified in the second data packet by resolving the second data packet.

3. A charging control method, applicable for a second electronic device connected with a first electronic device through a charging cable, and the method comprising:
    receiving a first data packet sent by the first electronic device, the first data packet including to-be-charged identification information and first characteristic information of the first electronic device;
    in response to receiving the first data packet, generating a second data packet, wherein the second data packet comprises power supply identification information and charging strategy information, a charging strategy represented by the charging strategy information comprises at least one of: the second electronic device performing power supply for the first electronic device, and the second electronic device receiving power supply from the first electronic device;
    sending the second data packet;
    wherein generating the second data packet comprises:
    determining the first characteristic information of the first electronic device according to the first data packet, the first characteristic information including first temperature information and first electricity quantity information, wherein the first data packet is generated according to the first characteristic information and the to-be-charged identification information;
    generating the second data packet according to the first data packet and a preset time interval, wherein the preset time interval represents a time for the second electronic device performing power supply this time when the charging strategy is the second electronic device performing power supply for the first electronic device;
    the method further comprises:
    receiving an updated first data packet, wherein the updated first data packet is sent by the first electronic device after performing the charging strategy for the preset time interval, the updated first data packet comprises current first characteristic information.

4. The method according to claim 3, wherein, generating the second data packet comprises:
    obtaining second characteristic information of the second electronic device, the second characteristic information including second temperature information and second electricity quantity information;
    determining the charging strategy information according to the first characteristic information and the second characteristic information;
    generating the second data packet according to the charging strategy information and the power supply identification information.

5. The method according to claim 4, wherein determining the charging strategy information according to the first characteristic information and the second characteristic information comprises:
    in response to the first temperature information or the second temperature information being outside a preset temperature range, determining the charging strategy as the second electronic device stopping supplying power.

6. The method according to claim 5, wherein determining the charging strategy information according to the first characteristic information and the second characteristic information further includes:
    when the first temperature information or the second temperature information is within the preset temperature range, in response to the first electricity quantity information and the second electricity quantity information not satisfying a preset power supply condition, determining the charging strategy as the second electronic device stopping supplying power.

7. The method according to claim 6, wherein determining the charging strategy information according to the first characteristic information and the second characteristic information further comprises:
    when the first electricity quantity information and the second electricity quantity information satisfies the preset power supply condition,
    in response to difference information between the first electricity quantity information and the second electricity quantity information reaching a electricity quantity difference threshold, determining the charging strategy as the first electronic device switching a power role with the second electronic device to enable the first electronic device to supply power for the second electronic device, wherein the power role is configured to represent a state of the first electronic device or the second electronic device as a to be charged state or a power supply state;

in response to the difference information not reaching the preset electricity quantity difference threshold, determining the charging strategy as the second electronic device performing power supply.

8. The method according to claim 3, further comprising: determining the preset time interval according to the first characteristic information and the second characteristic information.

9. The method according to claim 8, wherein determining the preset time interval according to the first characteristic information and the second characteristic information comprises:

determining time intervals respectively corresponding to the first temperature information, the second temperature information and the difference information, according to the first temperature information, the second temperature information and the difference information between the first electricity quantity information and the second electricity quantity information;

determining a minimum duration among the corresponding time intervals as the preset time interval.

10. The method according to claim 9, wherein determining the time intervals respectively corresponding to the first temperature information, the second temperature information and the difference information, according to the first temperature information, the second temperature information and the difference information between the first electricity quantity information and the second electricity quantity information comprises:

obtaining first configuration information and second configuration information, wherein the first configuration information is configured to represent a corresponding relationship between temperature intervals and time intervals, and the second configuration information is configured to represent a correspondence relationship between difference intervals in electricity quantity and time intervals;

determining a first time interval corresponding to the first temperature information according to the first temperature information and the first configuration information;

determining a second time interval corresponding to the second temperature information according to the second temperature information and the first configuration information;

determining a third time interval corresponding to the difference information according to the difference information and the second configuration information;

wherein determining the preset time interval includes: determining a minimum duration among the first time interval, the second time interval and the third time interval as the preset time interval.

11. An electronic device, comprising:
a processor;
a memory for storing executable instructions by the processor; wherein,
when the instructions are executed by the processor, the processor is configured to:

receive a first data packet sent by a first electronic device, wherein, the first data packet comprises to-be-charged identification information and first characteristic information of the first electronic device;

generate a corresponding second data packet, wherein the second data packet comprises power supply identification information and charging strategy information, a charging strategy represented by the charging strategy information comprises at least one of: a second electronic device performing power supply for the first electronic device, and the second electronic device receiving power supply from the first electronic device; and send the second data packet;

wherein the processor is further configured to:

determine the first characteristic information of the first electronic device according to the first data packet, the first characteristic information including first temperature information and first electricity quantity information, wherein the first data packet is generated according to the first characteristic information and the to-be-charged identification information;

generate the second data packet according to the first data packet and a preset time interval, wherein the preset time interval represents a time for the second electronic device performing power supply this time when the charging strategy is the second electronic device performing power supply for the first electronic device; and receive an updated first data packet, wherein the updated first data packet is sent by the first electronic device after performing the charging strategy for the preset time interval, the updated first data packet comprises current first characteristic information.

12. The electronic device according to claim 11, wherein, the processor is configured to:

obtain second characteristic information of the second electronic device, the second characteristic information including second temperature information and second electricity quantity information;

determine the charging strategy information according to the first characteristic information and the second characteristic information;

generate the second data packet according to the charging strategy information and the power supply identification information.

13. The electronic device according to claim 12, wherein the processor is configured to:

in response to the first temperature information or the second temperature information being outside a preset temperature range, determine the charging strategy as the second electronic device stopping supplying power.

14. The electronic device according to claim 13, wherein the processor is configured to:

when the first temperature information or the second temperature information is within the preset temperature range, in response to the first electricity quantity information and the second electricity quantity information not satisfying a preset power supply condition, determine the charging strategy as the second electronic device stopping supplying power.

15. The electronic device according to claim 14, wherein the processor is configured to:

when the first electricity quantity information and the second electricity quantity information satisfies the preset power supply condition, in response to difference information between the first electricity quantity information and the second electricity quantity information reaching a electricity quantity difference threshold, determine the charging strategy as the first electronic device switching a power role with the second electronic device to enable the first electronic device to supply power for the second electronic device, wherein, the power role is configured to represent a state of the first electronic device or the second electronic device as a to be charged state or a power supply state;

in response to the difference information not reaching the preset electricity quantity difference threshold, determine the charging strategy as the second electronic device performing power supply.

16. The electronic device according to claim 11, wherein the processor is configured to:
determine the preset time interval according to the first characteristic information and the second characteristic information.

17. The electronic device according to claim 16, wherein the processor is configured to:
determine time intervals respectively corresponding to the first temperature information, the second temperature information and the difference information, according to the first temperature information, the second temperature information and the difference information between the first electricity quantity information and the second electricity quantity information;

determine a minimum duration among the corresponding time intervals as the preset time interval.

18. The electronic device according to claim 17, wherein the processor is configured to:
obtain first configuration information and second configuration information, wherein the first configuration information is configured to represent a corresponding relationship between temperature intervals and time intervals, and the second configuration information is configured to represent a correspondence relationship between difference intervals in electricity quantity and time intervals;

determine a first time interval corresponding to the first temperature information according to the first temperature information and the first configuration information;

determine a second time interval corresponding to the second temperature information according to the second temperature information and the first configuration information;

determine a third time interval corresponding to the difference information according to the difference information and the second configuration information;

determine a minimum duration among the first time interval, the second time interval and the third time interval as the preset time interval.

* * * * *